(12) United States Patent
Kuenzner

(10) Patent No.: US 8,452,476 B2
(45) Date of Patent: May 28, 2013

(54) DIALOGUE SYSTEM

(75) Inventor: Hermann Kuenzner, Freising (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 496 days.

(21) Appl. No.: 12/763,496

(22) Filed: Apr. 20, 2010

(65) Prior Publication Data

US 2010/0204875 A1 Aug. 12, 2010

Related U.S. Application Data

(63) Continuation of application No. PCT/EP2008/008745, filed on Oct. 16, 2008.

(30) Foreign Application Priority Data

Oct. 25, 2007 (DE) .................. 10 2007 051 014

(51) Int. Cl.
*G06F 3/00* (2006.01)

(52) U.S. Cl.
USPC .......................................... 701/29.1; 74/552

(58) Field of Classification Search
USPC .................. 701/1, 29, 36, 49, 29.1; 345/661, 345/689, 156; 74/479.01, 552
See application file for complete search history.

(56) References Cited

U.S. PATENT DOCUMENTS

| | | | |
|---|---|---|---|
| 6,005,299 A * | 12/1999 | Hengst | 307/10.1 |
| 6,411,877 B2 * | 6/2002 | Bockmann et al. | 701/48 |
| 6,556,222 B1 * | 4/2003 | Narayanaswami | 715/786 |
| 6,769,320 B1 | 8/2004 | Bollgohn et al. | |
| 7,123,972 B2 * | 10/2006 | Lee | 700/36 |
| 2005/0004728 A1 | 1/2005 | Lee | |
| 2007/0016370 A1 | 1/2007 | Kuenzner | |
| 2007/0242050 A1 | 10/2007 | Kuenzner et al. | |

FOREIGN PATENT DOCUMENTS

| | | |
|---|---|---|
| DE | 43 38 171 C1 | 4/1995 |
| DE | 199 44 324 A1 | 3/2001 |
| DE | 100 09 727 A1 | 9/2001 |
| DE | 103 52 057 A1 | 1/2005 |
| DE | 10 2004 014 390 A1 | 10/2005 |
| DE | 10 2004 058 954 A1 | 6/2006 |
| DE | 10 2005 016 006 A1 | 10/2006 |
| EP | 1 130 560 A2 | 9/2001 |
| GB | 2 283 714 A | 5/1995 |

OTHER PUBLICATIONS

International Search Report dated Feb. 3, 2009 with English translation (four (4) pages).
German Search Report dated Dec. 5, 2011 (five (5) pages).

* cited by examiner

*Primary Examiner* — Dalena Tran
(74) *Attorney, Agent, or Firm* — Crowell & Moring LLP

(57) ABSTRACT

In a dialogue system for a motor vehicle, the dialogue system including a plurality of control keys, assigning a function from a predefined set of functions to at least one of the control keys in such a manner that the function is executed upon actuation of the control key. At least one of the functions which can be assigned to the control key is configured as the master function. During the execution of the master function the current value of at least one parameter of a subordinate function that correlates with at least one state of the motor vehicle is determined, and the subordinate function is executed as a function of this value.

14 Claims, 1 Drawing Sheet

DIALOGUE SYSTEM

CROSS-REFERENCE TO RELATED APPLICATIONS

This application is a continuation of PCT International Application No. PCT/EP2008/008745, filed Oct. 16, 2008, which claims priority under 35 U.S.C. §119 from German Patent Application No. DE 10 2007 051 014.6, filed Oct. 25, 2007, the entire disclosures of which are herein expressly incorporated by reference.

This application contains subject matter related to U.S. application Ser. No. 12/763,531, entitled "Dialogue System for a Motor Vehicle," filed on even date herewith.

BACKGROUND AND SUMMARY OF THE INVENTION

The invention relates to a dialogue system for a motor vehicle. The dialogue system includes a plurality of control keys, at least one of which can be assigned a function from a predefined set of functions in such a manner to execute the function upon actuation of the control key.

The term "dialogue system" as used herein is equivalent to a multifunctional operating device for motor vehicles including a menu, video screen, and one or more operator controls.

A dialogue system of the above mentioned type is known, for example, from DE 10 2004 058 954 A1. The control keys of a dialogue system can usually be assigned variables, such as navigation destinations, telephone numbers, radio transmitters and/or audio sources. These particular assignment variables (e.g., navigation destinations, telephone numbers and/or radio transmitters) can represent a parameter of a function that is to be executed. For example, when a control key assigned to a navigation destination is actuated, a route guidance (e.g., function) to the navigation destination (e.g., parameter) is supposed to be initiated. Depending on the technical implementation of a conventional dialogue system, a control key can be assigned only the parameter, and the suitable function is determined by means of the category of the parameter when the control key (for example, route guidance in the case of a navigation destination) is actuated, or both the function and the parameter are assigned to the control key. Moreover, dialogue systems in which a control key is assigned only one such parameter by means of information technology must be included in the aforementioned genre, insofar as owing to the category of the parameter they are effectively also assigned a function that is suitable for utilizing said parameter.

It is an object of the invention to provide a dialogue system, which allows at least one additional advantageous type of assignment of a control key.

This object is realized with a dialogue system including a plurality of control keys, wherein a function from a predefined set of functions may be assigned to at least one control key. The control key can be configured as a master function during the execution of which the current value of a subordinate function that correlates with at least one state of the motor vehicle is determined and the subordinate function is executed as a function of the current value. Advantageous embodiments and further developments of the invention are apparent as described herein.

In one embodiment of the invention, at least one current parameter that relates to the motor vehicle required for execution of the control keys of the dialogue system and/or at least one control key of the dialogue system to be assigned functions may be determined prior to execution. In particular, many functions that are popular with motor vehicle users and that are often used depend on the current position of the motor vehicle. The invention allows one control key to be assigned such functions. For example, in a preferred embodiment of the present invention, a control key can be assigned a function to search for parking spaces in a defined area around the current position of the motor vehicle.

According to the invention, at least one of the functions which can be assigned to a control key is configured as a master function. During the execution of the master function the value of at least one parameter of a subordinate function that correlates with at least one state of the motor vehicle is determined prior to executing the subordinate function as a function of the parameter.

Determining the at least one parameter value can eliminate, to some extent, the concept induced drawback of having functions, whose execution requires that at least one current value of a parameters relating to the motor vehicle be known, as compared to functions that are not characterized by such current status requirements. Executing the subordinate function as a function of the previously determined parameter value, allows the dialogue system to ultimately fulfill the operator's expectations, that is, to execute the command issued from his viewpoint by depressing a single key.

The inventive structure of giving a first master function priority over a second subordinate function makes it possible for the user to trigger at least two operations of the dialogue system with a single key stroke. One function can determine the parameter value, and another function can execute the subordinate function on the basis of the previously determined parameter value.

According to a preferred embodiment of the present invention, the parameter correlates to a state of the motor vehicle and is the absolute position of the motor vehicle. The current value of the parameter is determined by the dialogue system. Many useful functions for informing the driver of a motor vehicle can depend on the current position of the motor vehicle.

According to another embodiment of the invention, on executing the master function, the determination of the absolute position of the motor vehicle is totally re-initiated and is carried out on the basis of suitable sensors.

In contrast, in another embodiment of the invention provides that the determination of the absolute position of the motor vehicle is carried out by accessing only a parameter value that already exists in the motor vehicle and that provides and/or characterizes the current absolute position of the motor vehicle. For example, in many motor vehicles that are equipped with a navigation system, the absolute position of the motor vehicle is determined on a continuous basis in any event at least when the navigation system is activated. Accordingly, determination of the absolute position of the motor vehicle in the case of the invention can be directed to accessing a result of absolute position data determined by the navigation system or a derivative of the result.

In yet another embodiment of the invention, another motor vehicle device may be provided, for example a navigation system or a location finding system, to carry out a determination of the absolute position of the motor vehicle in order to then use the result of this determination.

In a preferred embodiment of the present invention, the subordinate function is defined as a search in electronic map data for at least one special destination in a defined area around the absolute position of the motor vehicle. For example, a search can be conducted for parking spaces in a defined area around the absolute position of the motor vehicle. Furthermore, the possibility of assigning a search to a control key for restaurants, hotels, gas stations and/or places of interest in a defined area around the absolute position of the motor vehicle should also be regarded as advantageous.

In a further embodiment of the invention, the subordinate function can be executed as a function of the value of at least one additional parameter. In particular, the additional parameter can be a parameter that is designed as the characteristic quantity of a limited area around the current position of the motor vehicle. For example, a parameter may relate to the radius of a circle. This further development of the invention provides, in addition to the flexibility in the execution of the function with respect to the current position of the motor vehicle, flexibility with respect to the value of at least one additional parameter.

This flexibility can be made useful to the operator in that the dialogue system is designed in such a manner that a value of at least one additional parameter can be adjusted by the operator, and the operator-adjusted value can be assigned to the master function and/or the control key in such a way that the value is available on actuation of the control key for executing the subordinate function. Thus, the value of the additional parameter does not have to be retrieved by the operator himself upon every actuation of the control key. Rather the actuation of the control key retrieves instantaneously the result desired by the operator because only the value provided by the aforementioned assignment is used. Nevertheless, in principle the operator has the option of modifying the value of the parameter and, as a result, adapting it to his needs and/or desires.

The adjustment of the parameter value by the operator can be carried out based on a menu, for example, preferably within a hierarchical menu structure, with which the operator interacts by way of a multifunctional operating element which can be designed as a rotary and/or pressure actuator.

Assignment of the operator-adjusted value to the master function can be performed, for example, automatically by the dialogue system, in that when the control key is assigned the master function (which can be done in a manner known from the prior art by means of a long key stroke or a dedicated configuration menu), the current (e.g., menu based) adjusted value of the additional parameter is determined, and the result of this determination is assigned to the master function as the input variable that is to be utilized during execution.

Assignment of the operator-adjusted value to the control key can be performed, for example, automatically by the dialogue system, in that when the control key is assigned the master function, the current adjusted value of the additional parameter is determined, and the result of this determination is assigned to the control key in addition to the master function. For example, a pointer to the master function and the value of the parameter can be stored jointly in the corresponding location of a memory unit.

Preferably the parameter value, which was assigned to the master function and/or the control key in accordance with, or in a similar manner to, one of the aforementioned embodiments, remains unchanged even if the value of the additional parameter is changed by the operator at a later date. Thus, the master function and/or the control key remains at the value of the additional parameter at the point in time at which the control key is assigned the master function. This feature offers the operator the advantage that actuating the control key, independently of the subsequent (for example, menu based) changes of the additional parameter, always has the same consequence. If the operator wants to execute the subordinate function using a different value of the additional parameter, this may be achieved, if assisted by the dialogue system, on the basis of a menu or by reassigning the control key accordingly.

The invention can be implemented to advantageously allow for designing the dialogue system in such a way that the current assignment of the control key can be indicated in response to an operator request. Therefore, the request operation can inform the operator, which is and/or would be the consequence of actuating the control key.

The request operation can include, for example, softly touching the control key, gently tapping the control key, motion of the operator's hand near the control key, and if the dialogue system is capable of detecting such a contact, gentle tapping and/or a similar approach.

In another embodiment of the invention, the operator can advantageously interact with a control key, which is assigned the master function, according to the following. In response to a first request operation of an operator, a description of the master function is displayed. For example, for this purpose display output may be the text: "Search for gas stations in the area." In response to an additional second request operation of an operator, the value of the aforementioned at least one additional parameter is displayed. Display of the at least one additional parameter can occur preferably either in conjunction with a description of the master function, for example, "Search for gas stations in the area, radius of the search: 5 km" or in conjunction with a designation of the subordinate function, for example, "Search for gas stations in a radius of 5 km around the current position."

Touching the control key can relate to the first request operation and maintaining contact over a defined period of time, for example, two seconds, can relate to the second request operation.

Preferably, functions of the predefined set of functions that can be assigned to the control key are organized in a hierarchical menu structure and can be triggered by selection via a multifunctional operating element. The multifunctional operating element can be designed as one of a rotary and/or pressure actuator.

Other objects, advantages and novel features of the present invention will become apparent from the following detailed description of one or more preferred embodiments when considered in conjunction with the accompanying drawings.

DETAILED DESCRIPTION OF THE DRAWINGS

A control key 1 in a motor vehicle can be assigned functions in a free and unrestrained manner. The functions, which are available for assignment, are organized in a hierarchical menu structure and can be triggered by selection via a multifunctional operating element. Using the multifunctional operating element, the operator can also navigate through the menu structure and pinpoint functions. The control key 1 is assigned a specific function when the operator holds down the control key 1 so that it is depressed for several seconds, while the function is pinpointed in a menu image.

If the control key 1 is assigned functions which do not require knowing the current position of the vehicle for correct execution, then the assignment between a control key and the function occurs without determining a parameter of a subordinate function. Furthermore, when the control key 1 is actuated, the function is executed without a parameter of the subordinate function.

Figure 1:
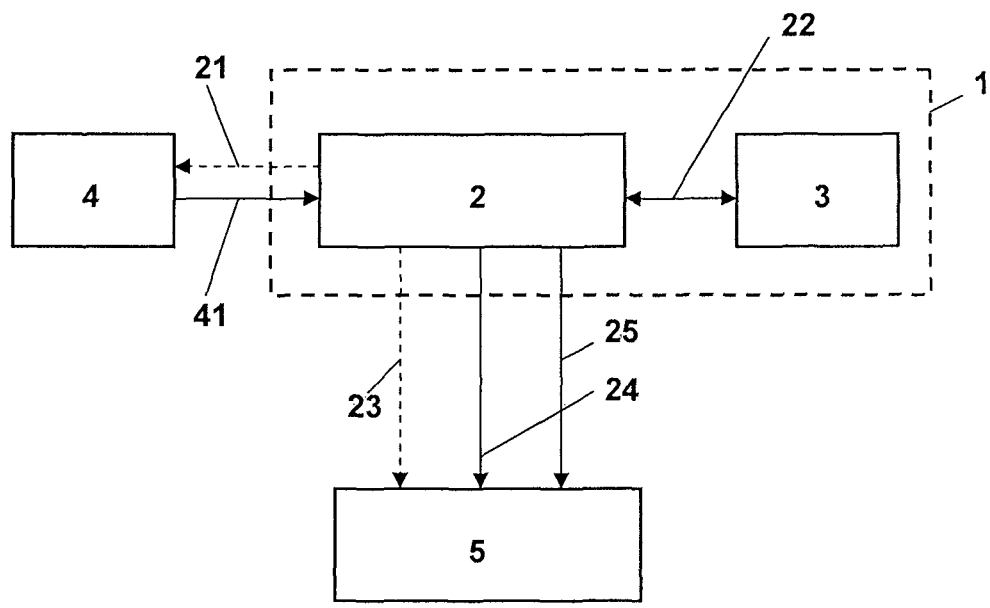
FIG. 1 depicts a schematic drawing of the signal flow, when a control key in a motor vehicle is actuated.

FIG. 1 illustrates the special case of the control key 1 being assigned a master function 2, the execution of which requires knowing the current position of the vehicle. In this case the master function 2 can be called simply "search for gas stations." From a functional viewpoint, the master function may be described in strict terms as "search for gas stations in an area having a radius (which is yet to be defined) around the current position (which is yet to be defined) of the motor vehicle." In this case neither the area nor the current position is pinned down by means of the master function 2 or goes directly into said function.

However, when the control key 1 has been assigned to the master function 2, the control key is assigned not only the master function 2, but also a value 3 for the radius of the circle. In this case, prior to assignment of the value, the value was adjusted by the operator using a menu for such a search and which was valid at the time of the assignment. Alternatively, the value 3 could also have been retrieved interactively by the operator during the assignment.

In the present case the value 3 is stored jointly with a pointer to the master function 2 in the location of a memory unit of the motor vehicle that is provided in a manner known from the prior art for specifying the assignment of the control key 1.

The value 3 remains assigned to the control key in an unmodified state, even if the operator has set a different value for such a search on the basis of a menu in the meantime since the assignment.

FIG. 1 illustrates a graphical representation of the signal flow when the control key 1, as assigned above, is actuated. If the control key 1 is actuated, the actuation results initially in the execution of the master function 2. This master function 2 consists of determining the current position of the vehicle. In the present case this determination of the current position of the vehicle consists of a request 21 for the current position of the vehicle to a navigation system 4 of the motor vehicle.

In response to the request 21, the navigation system 4 provides the current position as the answer 41.

Then the master function 2 reads the value 3 out of the aforementioned memory unit. FIG. 1 shows this readout as a double arrow 22.

Then the master function 2 in turn calls the subordinate function 5, this call is shown by the arrow 23 in FIG. 1.

The subordinate function 5 is defined as a "search for gas stations in an area within a radius X of a circle—the position Y." The subordinate function 5 expects the transfer of the input variables X and Y with the call.

With the call 23, the master function 2 passes the parameter value for the current position (shown by arrow 24) to the subordinate function 5 as the input variable X, which it has received previously as the answer 41 from the navigation system.

In addition, with the call 23 the master function 2 passes the parameter value (shown by arrow 25) to the subordinate function 5 as the input variable Y, the parameter value for the area that it previously read out (double arrow 22).

At this point the subordinate function 5 can be executed while utilizing the values for the input variables X and Y that have been specified in this way. To this end, after previously setting the value 3, the operator only has to exert pressure once on the control key 1.

Figure 2:
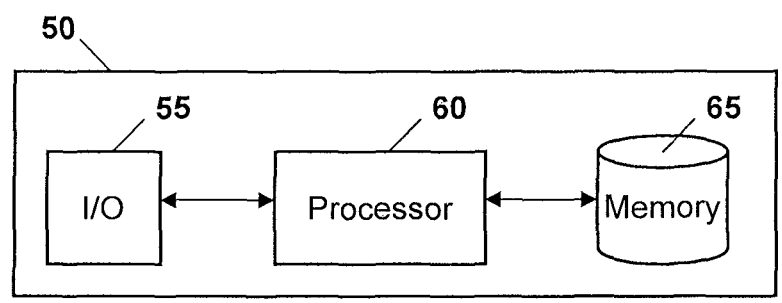
FIG. 2 depicts a simplified block diagram of a dialogue system according to one embodiment.

FIG. 2 depicts a simplified diagram of a dialogue system according to one embodiment. Dialogue system 50 includes input/output interface (I/O) 55 which can include one or more control keys. For example, the one or more control keys of dialogue system 50 may relate to a multifunction operating element, such as rotary or pressure actuator. In one embodiment, I/O 55 may be configured to receive data from a navigation system or location finding system, such as absolute position data of the motor vehicle. I/O 55 may further be configured display of text and/or output data for display.

Processor 60 of dialogue system 50 is coupled to I/O 55 and memory 65. Processor 60 may be configured to perform one or more functions as described herein, including assigning functions to control keys. Processor 60 may execute one or more master and subordinate functions based on user activation of a control key.

Memory 65 relates to one of a RAM and ROM memories, and may be configured to store a value parameter, such as a current position or radius. Memory 65 may further store a value jointly with a pointer to master function.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A dialogue system for a motor vehicle, the dialogue system comprising:
    a plurality of control keys, wherein at least one of the control keys can be assigned a function from a predefined set of functions of the dialogue system in such a manner that the function is executed upon actuation of this control key; and
    a processor coupled to the control keys, the processor configured to execute the function, wherein the function assigned to the control key is configured as the master function, and
    determine a current value of at least one parameter of a subordinate function that correlates with at least one state of the motor vehicle during the execution of the master function, wherein the subordinate function is executed as a function of the current value and relates to a search in electronic map data for at least one special destination in a defined area around an absolute position of the motor vehicle, wherein the subordinate function can be executed as a function of a value of at least one additional parameter corresponding to a characteristic quantity of a limited area around the absolute position of the motor vehicle.

2. The dialogue system of claim 1, wherein the state of the motor vehicle that correlates to the parameter is the absolute position of the motor vehicle.

3. The dialogue system of claim 1, wherein the characteristic quantity of the limited area is a radius of a circle.

4. The dialogue system of claim 1, wherein the value of the at least one additional parameter can be adjusted by an operator, and can be assigned to one or more of the master function and the control key in such a way that the value is available on actuation of the control key for executing the subordinate function.

5. The dialogue system of claim 4, wherein in response to the control key being assigned the master function,
    a designation of the master function is displayed in response to a first request operation of an operator, and
    the value of at least one additional parameter is displayed in response to an additional second request operation of an operator.

6. The dialogue system of claim 1, wherein the current assignment of the control key can be displayed in response to a request operation of an operator.

7. The dialogue system of claim 1, wherein the functions of the predefined set of functions are organized in a hierarchical menu structure and can be triggered selection via a multifunctional operating element, and wherein the multifunctional operating element is designed as one of a rotary and/or pressure actuator.

8. A method for assigning a function from a predefined set of functions of a dialogue system to a control key of a motor vehicle, the method comprising the acts of:

detecting activation of a control key, the control key associated with a master function;

executing the master function by a processor of the dialogue system;

determining a current value of at least one parameter of a subordinate function that correlates with at least one state of the motor vehicle during the execution of the master function;

executing the subordinate function as a function of the current value of the at least one parameter, wherein the subordinate function relates to a search in electronic map data for at least one special destination in a defined area around an absolute position of the motor vehicle, wherein the subordinate function can be executed as a function of a value of at least one additional parameter corresponding to a characteristic quantity of a limited area around the absolute position of the motor vehicle.

9. The method of claim 8, wherein the state of the motor vehicle that correlates to the parameter is the absolute position of the motor vehicle.

10. The method of claim 8, wherein the characteristic quantity of the limited area is a radius of a circle.

11. The method of claim 8, further comprising detecting adjustment of the value of the at least one additional parameter by an operator, and assigning the at least one additional parameter to one or more of the master function and the control key in such a way that the value is available upon actuation of the control key for executing the subordinate function.

12. The method of claim 11, wherein in response to the control key being assigned the master function, displaying a designation of the master function in response to a first request operation of an operator, and displaying the value of at least one additional parameter is displayed in response to an additional second request operation of an operator.

13. The method of claim 8, further comprising displaying the current assignment of the control key in response to a request operation of an operator.

14. The method of claim 8, wherein the functions of the predefined set of functions are organized in a hierarchical menu structure and can be triggered selection via a multifunctional operating element, and wherein the multifunctional operating element is designed as one of a rotary and/or pressure actuator.

* * * * *